June 29, 1948.
P. PEVNEY
2,444,114
COORDINATED LOCKS, EQUALIZING
VALVES AND CLOSURE SEALS
Filed March 4, 1944
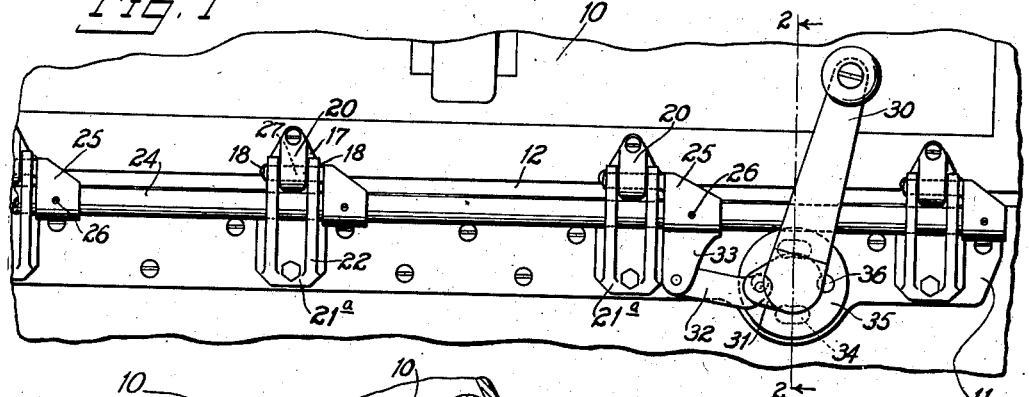
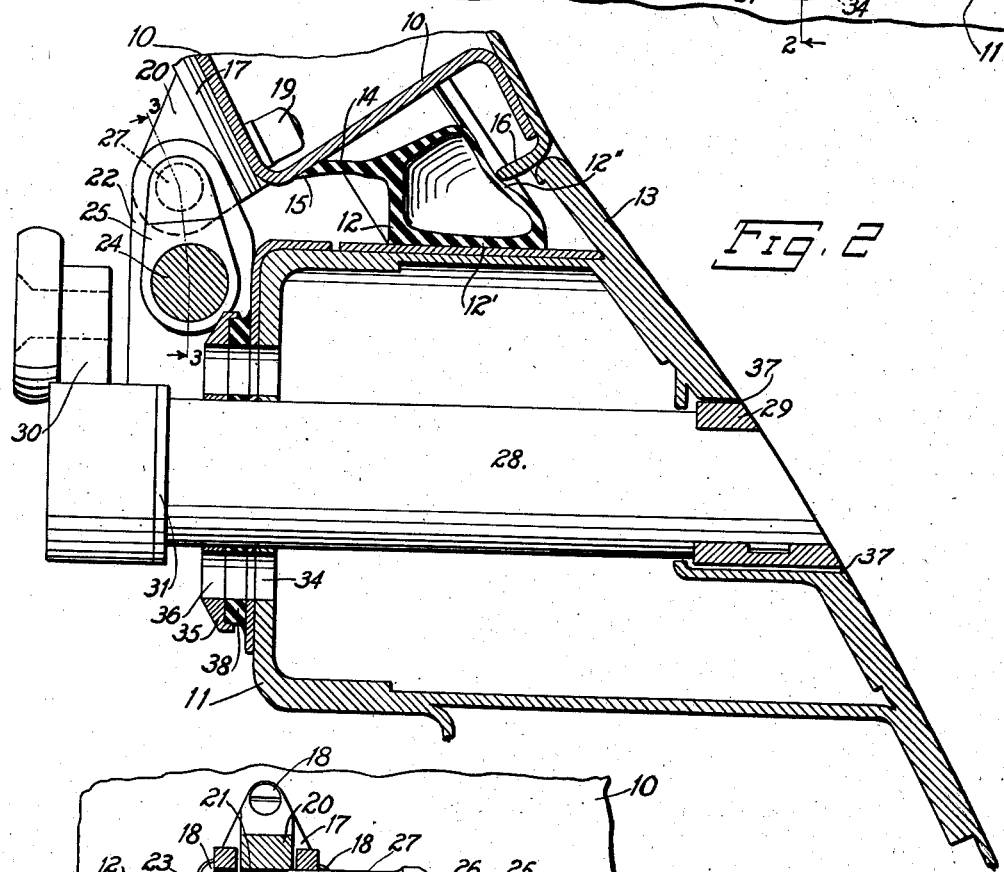
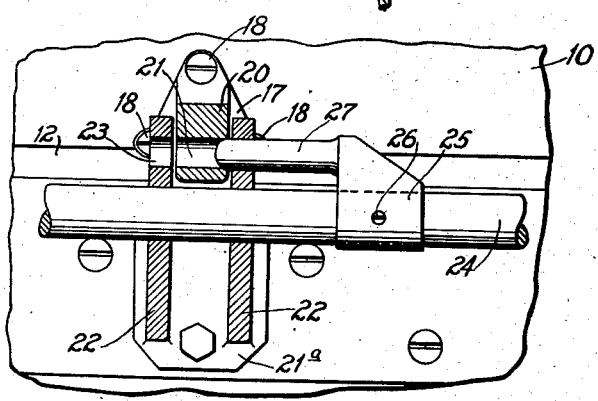
INVENTOR.
Paul Pevney
BY
ATTORNEY.

Patented June 29, 1948

2,444,114

UNITED STATES PATENT OFFICE 2,444,114

COORDINATED LOCK, EQUALIZING VALVE, AND CLOSURE SEAL

Paul Pevney, Massapequa, N. Y., assignor to Republic Aviation Corporation, Farmingdale, N. Y., a corporation of Delaware Application March 4, 1944, Serial No. 525,131

15 Claims. (Cl. 244—121)

This invention comprises a combined and coordinated lock and equalizing valve and coacting seal for use in conjunction with a movable or removable closure and the structure with which it cooperates, such, for instance, as the canopy of an aircraft or a part or section thereof and the cooperating fuselage structure.

While the present invention is adaptable to all types of closures or doors it is particularly designed for use in conjunction with the canopy, or a closure section of the canopy, which combines with the fuselage of an aircraft to define a high-pressure cabin wherein, under certain circumstances and at any altitude in excess of a predetermined minimum, pressure is to be maintained in excess of the outer atmospheric pressure. In such environment it is proposed to position a fluidtight seal between adjoining surfaces of the fuselage and the canopy, established and maintained by a lock operable to releasably secure the canopy to the fuselage with the respective adjoining edge portions secured one to the other throughout their lengths.

The instant invention also contemplates a pressure equalizing valve coordinated with the lock, the operation of which is such that any differential of pressure upon the opposite sides of the closure or canopy is equalized prior to the release of the closure or canopy from its locked sealed position.

With the above and other objects in view, as will be apparent, the invention consists in the construction, combination and arrangement of parts, all as hereinafter more fully described, claimed and illustrated in the accompanying drawings, wherein:

Fig. 1 is an inside longitudinal elevation of a portion of a removable canopy or canopy section of an aircraft illustrated in cooperation with a fragment of a fuselage and with the coordinated lock and valve of the present invention in respectively locking and closed positions:

Fig. 2 is an enlarged vertical section along line 2—2 of Fig. 1 and constitutes a transverse section through the locking mechanism and the pressure equalizing valve coordinated therewith, the valve being shown open: and Fig. 3 is a vertical section taken along line 3—3 of Fig. 2 through complemental lock elements to illustrate the same in the relative positions assumed just prior to the complete release of the closure or canopy and after the valve has been opened to equalize the pressure within and without the cabin defined by the fuselage and canopy.

The present invention is primarily designed as a lock for the canopy or a section of the canopy of a high altitude aircraft having a pressurized cabin wherein the pressure is constantly maintained at the equivalent of atmospheric pressure at a predetermined altitude regardless of the actual altitude attained by the ship. For example, the pressure within the cabin is maintained at, say, the atmospheric pressure normal at an altitude of 10,000 feet, and thus when the aircraft attains an altitude of 35,000 feet, the pressure within the cabin is many times that of the surrounding atmosphere. The cabin of an aircraft designed to operate under such conditions constitutes a substantially fluidtight barrier between the relatively high internal pressure and the relatively low external pressure to prevent any leakage of the former and an ultimate reduction thereof to the magnitude of the latter. Hence the canopy, which includes any door or doors or canopy sections, and the lines of abutment thereof with the supporting structure, such as the fuselage, must be sealed against leakage or reduction of the internal pressure: it must be so secured in place, that not only is it so sealed against leakage, but the canopy per se as well as the seal must be securely retained in their operative positions: the lock must have sufficient strength to resist the high pressure within the cabin defined in part by the canopy: and the lock must also be lockingly effective throughout the approximate abutment between adjoining edges of the canopy and fuselage and yet be quickly and easily releasable to free or disengage the canopy from the supporting structure or fuselage.

In case of an emergency at altitudes greater than the altitude represented by the predetermined pressure within the cabin which requires the pilot to abandon the aircraft, he in so doing passes from the relatively high pressure of the confined space within the cabin into the comparatively low pressure of the surrounding atmosphere. Such quick transition from relatively high pressure to relatively low pressure—i. e., where the air pressure on the body of the pilot is radically and quickly reduced—causes the nitrogen in the blood to bubble out, resulting in obstruction of the capillaries and severe pains and frequently occasions a temporary "blackout" or period of unconsciousness on the part of the pilot. This occurs at a moment when his full physical and mental faculties are required to clear the aircraft completely prior to releasing his parachute and to release and manipulate his parachute after being clear of the abandoned aircraft. The present invention, being especially designed for use in conjunction with the pressure cabin of a high altitude aircraft, therefore proposes a fluidtight seal between canopy or section thereof and the fuselage or other supporting structure combining with the canopy to define the cabin; a lock between the free or unhinged edge of the canopy and the fuselage or longéron of the aircraft which will sealingly lock the free or unhinged edge of the door or canopy to the longéron or other supporting structure throughout the length thereof; a control for the release of said lock so that the entire free or unhinged edge of the door or canopy will be released or disengaged at one and the same time; and an equalizing valve coordinated with the lock to establish full and free communication between the interior of the cabin and the exterior atmosphere surrounding the cabin, thereby equalizing the internal and external pressures prior to the release of the lock and the freeing of the canopy.

In short, the present invention provides a fluidtight seal for the door or canopy, a lock for the free or unhinged edge thereof, and a valve under the control of the lock to equalize the pressure within and without the exterior of the cabin prior to the release of the door or canopy. Thus the desired internal pressure within the cabin is maintained and at the same time the reduction thereof to atmospheric pressure is accomplished prior to the release of the door or canopy for emergency opening or escape. While the time between the equalization of the internal and external pressures and the full release of the door or canopy is relatively short, it has been found to be sufficient to prevent any untoward inconvenience to the pilot in abandoning the aircraft or period of unconsciousness.

Reference being had more particularly to the drawings, 10 designates the canopy or closure of an aircraft here fragmentarily illustrated. The structure of this closure or canopy is immaterial and forms no part of the present invention. It may be a canopy formed in two sections hinged one to the other at the peak; it may constitute a single unitary canopy having no hinged sections but secured to the sides of the cockpit or the longérons of the fuselage at its edges; or it may be a canopy fixed to or built upon the aircraft fuselage over the cockpit and having a door for ingress and egress; but in each case the closure or canopy has an edge or edge surface which approximately abuts and cooperates with the longéron 11 of the aircraft to complete the enclosure of the cockpit space, defined in part by the canopy structure and in part by the fuselage. It is this edge that the present invention proposes to disengagingly lock to the longéron 11, the lock employed to that end being combined and coordinated with a valve whereby the pressure within the cabin or cockpit and the surrounding external atmospheric pressure may be equalized in the event of a differential between these pressures.

Since the cabin or enclosed cockpit is designed to have an internal pressure, under certain conditions, in excess of the surrounding atmospheric pressure it is necessary to provide a seal for the joint between the edge of the canopy or closure 10 and the longéron 11 of the fuselage. For that purpose a hollow, flexible seal 12 rests upon and is attached to the upper surface of the longéron 11 by any suitable means. This seal 12 is somewhat trapezoidal in cross-section to have one face 12' or its base resting upon and secured to the upper surface of the longéron 11 and an outer face 12'' resting substantially parallel to but spaced from the plane of the skin 13 of the fuselage. Opposed to the face 12'' and above the plane of the base 12' the body of the seal 12 is provided with an outwardly extending, substantially horizontal, flange 14 which terminates in a feather edge 15. The entire seal structure being made of flexible, elastic material, such as rubber, and the body 12 of the seal being hollow the walls thereof, and especially the thinner outer wall 12, may flex freely. The adjoining or abutting edge or face 10' of the closure or canopy 10 presents a solid, unbroken surface which bears against the feathered edge 15 of the flange 14 carried by the seal 12 when the canopy or closure 10 is closed. To assist in the sealing contact between the feathered edge 15 of the flange 14 and the inner face or edge 10' of the canopy or closure 10 the latter along its outer edge is provided with an angularly disposed, inwardly extending coextensive finger or flange 16. When the canopy or closure 10 has reached its full closed position the feathered edge 15 of the flange 14 of the seal 12 rests flush against the inner edge portion of the face or edge 10' of the canopy or closure while the internally projecting angularly disposed finger or flange 16 bears against and exerts a pressure on the wall 12'' of the seal 12. The pressure thus exerted by the finger or flange 16 upon the wall 12'' of the seal 12 causes a general flexing throughout the seal and its components resulting in a more intimate contact between the seal 12 and the upper surface of the longéron 11 and, by causing a distortion of the seal 12 and to some extent of the flange 14, moves the feathered edge 15 thereof into more intimate sealing contact with the inner marginal portion of the lower surface 10' of the canopy or closure 10. Thus when the closure or canopy is in its closed position the seal which is longitudinally coextensive with the inner surface 10' of the canopy or closure 10 and with the upper surface of the longéron 11, constitutes a fluidtight seal between the longéron 11 and the adjacent edge or surface 10' of the canopy or closure 10. It will be noticed that as the pressure in the cabin increases it can, by virtue of the relatively small open space between the canopy or closure 10 and the longéron 11, enter beneath the flange 14 to exert pressure against the under side thereof which urges its feathered edge 15 into more intimate contact with the edge of the canopy 10 to thereby increase the sealing contact. In this manner a fluidtight seal is provided between the canopy or closure 10 and the longéron 11 when the former is closed and in cooperation with the latter.

On the inner surface of the lower edge portion of the canopy or closure 10 are a series of bracket plates 17, each substantially triangular in elevation, resting flush against the inner surface of the canopy or closure. The corners or angles of these bracket plates 17 are attached to the lower edge portion of the canopy or closure 10 by the bolts 18 piercing both the plate 17 and the edge portion of the canopy or closure, said bolts being engaged by appropriate nuts 19 bearing against the opposed face of the edge portion of the canopy or closure 10. Each of these bracket plates carries a dependent, apertured lug or eye, the apertures 21 of the several lugs 20 along the inner edge 10 of the canopy or closure being aligned one with the other longitudinally of said edge.

Along the marginal edge portion of the longéron 11 are mounted a series of supporting plates 21ª, one plate being provided for cooperation with each of the lugs or eyes 20. These plates 21ª are mounted in any suitable manner on the inner surface, and adjoining the edge, of the longéron 11 and each of them is provided with a pair of spaced parallel outstanding bearing flanges 22. The upper ends of the flanges 22 of each plate 21ª are designed to span the corresponding lug or eye 20 carried at the edge of the canopy or closure 10 and each is provided with a transverse aperture 23 therein, the apertures 23 of each pair of flanges 22 aligning transversely the plate 21ª and, when the canopy or closure 10 is in its closed position with the lugs 20 positioned between the flanges 22 of the corresponding plate 21ª, the apertures 23 align and register with the opening 21 of the cooperating lug or eye 20.

An operating rod 24 is mounted for reciprocation through aligned openings in the flanges 22 of all of the supporting plates 21ª, said rod resting substantially parallel to the axes of the aligned apertures 23 in the flanges 22 and below the latter.

A collar 25 is secured to the reciprocable rod 24 adjacent each supporting plate 21ª, and is fixed to the rod by means of a set screw or other suitable fastening means 26. Each collar 25 carries a lock pin 27 which is always in alignment with the aligned apertures or holes 23 of the flanges 22 of the coacting supporting plate 21ª. Thus, when the rod 24 reciprocates to the left (Fig. 3) the pin 27 is projected through the aligned openings 23 and traverses and is seated in the opening 21 of the lug or eye 20 positioned between these flanges. All of the lugs 20 carried by the canopy or closure 10 will be simultaneously engaged by the several lock pins 27 upon the movement of the rod 24 in one direction and will remain engaged by the lock pins 27 during the initial movement of the rod 24 in a reverse direction or until the extremities of all of the pins have wholly been removed from the engagement by the apertures 21 of all of the lugs 20. Since the rod 24 has an appreciable movement before the lock pins are in complete locking engagement in the apertures 21—23, there is likewise a similar appreciable movement of the lock pins 27 and rod 24 in the reverse direction before the lock pins 27 are completely disengaged by the lugs or eyes 20. It is this movement of the rod 24 and of the lock pins 27, required for the complete freeing of the latter from the lugs 20, that permits of the coordinated equalization of the pressure within the cabin and the atmospheric pressure without the cabin prior to the freeing or disengaging of the canopy 10.

For the reciprocation of the rod 24 a handle shaft 28 is mounted transversely of the longéron, its outer end operating in a suitable bearing 29 and its inner end having a hand lever 30 fixed thereto. At its outer end, i. e. the end thereof operating in the bearing 29, the shaft may be provided with any desired type and construction of handle (not shown) for the manipulation of the shaft 28 and the locking mechanism controlled thereby from without the cabin. This shaft 28 and lever 30 at the inner end thereof is provided with an eccentric ear 31 which is connected by a link 32 to an extension 33 integral with and projecting below one of the collars 25 fixed and secured to the control rod 24. If the lever or handle 30 is moved in a counter-clockwise direction (Fig. 1) the ear 31 exerts a pull upon the link 32 and the extension 33 of the adjacent collar 25. This pull causes the rod 24 and all of the collars 25 secured thereto to move toward the right (Figs. 1 and 3) and this movement continues until all of the lock pins 27 are disengaged from the apertures 21 of their respective lugs or eyes 20, whereupon the edge of the canopy or closure 10 is completely freed throughout its length. Reversely, when the lugs or eyes 20 carried by the canopy edge are seated between the flanges 22 of their respective cooperating supporting plates 21ª the movement of the lever 30 to the right (Fig. 1) exerts a push on the link 32 and the extension 33 moving the rod 24 and the collars 25 in unison in a direction to the left (Figs. 1 and 3) until the lock pins 27 carried by the collars 25 are projected into and through the registering apertures 21—23 of the several cooperating lugs or eyes 20 and flanges 22 of the bearings 21ª thus locking the edge of the canopy or closure 10 to the longéron 11 as aforesaid.

Coordinated with the locking mechanism above described is a relief or equalizing valve which, upon the initial movement of the rod 24 to the right (Figs. 1 and 3) for the release of the canopy or closure 10, establishes communication between the interior of the cabin and the exterior atmosphere thereby permitting the escape of the internal pressure of the cabin to the atmosphere, equalizing the atmospheric pressure and that within the cabin. This escape of the internal pressure of the cabin continues as the lever 30 is moved to the left (Fig. 1) so that before the lock pins 27 of the collars 25 have become completely disengaged from the lugs or eyes 20 to release the canopy or closure 10, the pressure within the cabin has been reduced to the atmospheric pressure surrounding the fuselage. To that end the longéron 11 is provided with a series of elongated, arcuate apertures or vents 34 while a valve plate 35 fixed to and rotatable with the shaft 28 above these vents is provided with a series of circular apertures 36. The valve plate 35 having the circular apertures 36 being fixed to the shaft 28 and the lever 30, rotates with the lever to bring the apertures 36 of the valve plate 35 into registration with the elongated apertures or vents 34 of the longéron, which registration, because of the arcuate form of the vents 34 continues during an appreciable, if not the major, portion of the movement of the plate 35. The moment this registration is established the pressure within the cabin escapes through the registering apertures or vents 34 and 36, and continues to escape so long as this registration is established, passing to the exterior atmosphere through normally non-fluidtight openings such as the space or spaces 37 around the bearing 39 upon the exterior side of the longéron 11.

No specially provided openings or vents need be provided for this escape of the internal pressure of the cabin but, if desired, small openings may be provided in the skin 13 for that purpose. However, it has been found that the usual non-fluidtight openings normally present and which it is unnecessary to seal to maintain the cabin pressure, permit sufficient leakage.

A flexible and compressible gasket 38 is provided between the valve plate 35 and the face of the longéron 11. This gasket effectively seals the joint between the inner surface of the valve plate and the adjoining surface of the longéron 11 so that no internal fluid under pressure may readily escape from the cabin until, and only until, the apertures of vents 34 and 36 are in registration.

From the foregoing it is manifest that the movement of the lever 30 to the left (Fig. 1) brings the openings 34 and 36 into partial registration immediately upon the initiation of its movement while the simultaneous movement of the lock pins 27 continues, without releasing the lugs or eyes 20, until after the complete escape or venting off of all internal fluid under pressure within the cabin. The final part of the movement of the lever 30, rod 24 and lock pins 27, completes the disengagement of the lock pins 27 from the studs or eyes 20. The reverse movement of the lever moves the apertures 36 out of registration with the elongated apertures or vents 34 and re-seats the lock pins 27 in the apertures 21 of the lugs or eyes 20.

While the present invention has been described in conjunction with a pressure cabin or pressurized cabin of an aircraft and the elements of the canopy or closure thereof, it is to be understood that this invention is readily and easily adaptable to any closure, which is to be locked and sealed, having greater pressure on one side than on the other, without departing from the spirit and scope hereof. So also, it is to be understood that the use herein of "canopy" or "closure" is meant to include any door or closure, the use of "longéron" is intended to describe any supporting structure or frame surrounding a door or closure opening, and that the use of "cabin" is to include any enclosed, sealed, high-pressure area or space.

What is claimed is:

1. The combination with a hollow fixed structure, of a movable closure cooperating therewith, said closure and structure combining to define an enclosed space and to maintain a pressure differential between the interior and exterior thereof, and the structure having a pressure-equalizing opening arranged and organized to establish communication, when open, between the interior and exterior of said structure, a plurality of locks interposed between said closure and said structure for maintaining said closure immovable in its operative position, means for operating said locks in unison for engagement and release of said closure, a valve for opening and closing said pressure-equalizing opening, and unitarily-operable means for successively actuating said valve operating means and said valve to equalize the pressure between the interior and exterior of the structure prior to the release of said closure by said locks.

2. The combination with a fixed structure, of a closure movably cooperating therewith and combining with said structure to define and enclose a high pressure area, a seal between the closure and said structure operable to seal the joint between an edge of the closure and the structure against the escape of fluid under pressure, a series of lock elements carried adjacent the edge of said closure, a lock pin reciprocatingly mounted on the fixed structure individual to each lock element on the closure, means for operating said lock pins in unison for the engagement and disengagement of said lock elements of the closure, and a valve under the control of and coordinated with said operating means to establish communication between opposed sides of the closure and structure prior to the disengagement of said lock pins from the lock elements thereby permitting the escape of fluid under pressure from the high pressure area.

3. The combination with a fixed structure, of a closure movable for cooperation with said fixed structure, a hollow flexible seal having a base resting on and secured to said fixed structure, a flange projecting from said seal into the path of movement of the closure to rest flush against the edge thereof when closed, means carried by said closure to exert a pressure on the seal to increase the sealing pressure between the extremity of the flange and the closure, a series of apertured lugs spaced along the edge of said closure, a series of pairs of parallel flanges secured to the fixed structure each pair adapted to span a coacting apertured lug, said flanges having openings there registering with the aperture of said lug, a rod mounted for the reciprocation through all of said pairs of flanges, a series of collars carried by and secured to said rod, one for each pair of flanges, a lock pin projecting from each collar parallel to said rod and adapted to be positioned by the movement of the rod into and out of the registered apertures and openings of the coacting lug and flanges, the locking of the closure to the structure maintaining the pressure of the flange of the closure on the seal as aforesaid, a lever mounted for oscillation on said fixed structure, and a connection between said lever and said rod whereby the movement of the lever in one direction moves the rod in the opposite direction and vice versa.

4. The combination with a fixed structure, having a series of elongated vents, of a closure movable for cooperation with said fixed structure, and combining therewith to define and enclose a high pressure area, a hollow flexible seal having a base resting on said fixed structure and its sides angularly disposed relative thereto, a flange projecting from one side of the seal into the path of movement of said closure to rest flush against the edge thereof, means carried by the closure to exert a pressure on the side of the seal opposed to the flange to urge the edge portion of the flange and the base of the seal into more intimate contact respectively with the closure and the fixed structure, a series of apertured lugs attached to and spaced along the edge of said closure, a series of sets of companion flanges having transversely aligned openings correspondingly secured to and spaced along the fixed structure whereby each set of flanges engages over the corresponding lug with the openings of the flanges in registration with the aperture of the lug, an operating rod mounted for reciprocation through all of the sets of flanges, a collar fixed to said rod adjoining each set of flanges, a lock pin projecting from each collar to be moved into the aligned aperture and openings upon the movement of the rod in one direction and to be removed therefrom upon the movement of the rod in the reverse direction, a lever mounted for oscillation on said fixed structure adjacent the vents aforesaid, a connection between said lever and rod for the reciprocation of the latter upon the oscillation of the former, and a valve plate mounted over said elongated vents for movement with said lever, said plate normally closing the vents and having a series of openings therein to register and continue in reciprocation with the vents upon and during the movement of the rod in disengaging the lock pins from said studs whereby fluid under pressure escapes from the high pressure area prior to the disengagement of the studs aforesaid.

5. The combination with a fixed structure, having a series of elongated vents through it, of a closure movable for cooperation with said fixed structure to define and enclose a high pressure area, a substantially trapezoidal, hollow flexible seal having a base resting on and attached to said fixed structure, a flange projecting from one side of the seal into the path of movement of said closure to rest flush against the edge thereof, means carried by the closure to exert a pressure on the side of the seal opposed to the flange to urge the edge portion of the flange and to tend to urge the base of the seal into more intimate contact respectively with the closure and the fixed structure, a series of apertured lugs attached to and spaced along the edge of said closure, a series of sets of companion flanges having transversely aligned openings correspondingly secured to and spaced along the fixed structure whereby each set of flanges engages over the corresponding lug with the openings of the flanges in registration with the aperture of the lug, an operating rod mounted for reciprocation through all of the sets of flanges, a collar fixed to said rod adjoining each set of flanges, a lock pin carried by each collar to be projected into the aligned aperture and openings upon the movement of the rod in one direction and to be removed from the aperture of the lug upon the movement of the rod in the reverse direction, a lever mounted for oscillation on said fixed structure adjacent the vents aforesaid, a connection between said lever and rod for the reciprocation of the latter upon the oscillation of the former, a valve plate mounted for movement with the lever, having circular vents therein to register with the elongated vents of the fixed structure prior to the release of the lugs as aforesaid, and a compressible seal interposed between the valve plate and fixed structure and immovably secured to the latter, provided with vents of the same size and shape of the vents in the fixed structure.

6. The combination with a hollow fixed structure and a closure movable relative thereto, said structure having a pressure-equalizing opening arranged and organized to establish communication when open between the interior and exterior of the structure, said structure and closure defining and enclosing a pressure area, of a seal interposed between the closure and the fixed structure comprising a body resting on the fixed structure and a flexible flange extending therefrom for sealing contact with said closure, the pressure within the pressure area urging the said flange into more intimate, sealing contact with the closure, a lock to secure adjoining edges of the closure and structure one to the other throughout the lengths thereof, means for operating the lock to either free or secure the closure, a valve for opening and closing said pressure-equalizing opening, and unitarily-operable means for successively actuating said lock operating means and said valve to equalize the pressure between the interior and exterior of the structure prior to the release of the lock and the freeing of the closure.

7. The combination with a fixed structure and a closure movable relative thereto, said structure and closure cooperating to define and enclose a pressure area, and the structure having a pressure-equalizing opening arranged and organized to establish communication when open between the interior and exterior of the structure, of a seal carried by the fixed structure for coaction with the closure upon cooperation of the two to define and enclose the pressure area, means whereby the pressure within the pressure area and the closure combine in acting on said seal to increase the coaction thereof with both the fixed structure and the closure, a lock functioning between adjoining edge portions of the structure and the closure to releasably attach the closure to the structure and thereby define the said pressure area and retain the seal in its fully operative position, means to operate the lock to attach the closure to or release it from the fixed structure, a valve for opening and closing the pressure-equalizing opening, and means for successively actuating said valve and lock operating means to equalize the pressure between the interior and exterior of the structure prior to the release of the closure from cooperation with said fixed structure.

8. The combination with a fixed structure and a closure movably cooperating therewith to define a closed pressure area, of a seal interposed between the fixed structure and the closure upon the mutual cooperation thereof to render the joint between them fluid tight, means whereby the pressure exerted on both the fixed structure and the closure by the seal aforesaid increases upon and by the cooperation of the closure and the fixed structure, a plurality of complemental and interengaging lock elements disposed along the adjacent edges of the fixed structure and the closure whereby the latter may be releasably secured to the former upon the interengagement of said lock elements, control means for making or breaking the interengagement of said lock elements in unison to secure the closure to, or release it from, the fixed structure, means of communication between the opposite sides of said fixed structure and closure, and means coordinated with said control means and organized and associated with said means of communication to close and seal the latter upon the interengagement of the lock elements to secure the closure to the fixed structure.

9. In an aircraft embodying a fuselage and an openable and jettisonable canopy combining with the fuselage to define a high pressure cabin the fuselage having a pressure-equalizing opening arranged and organized to establish communication when open between the interior and exterior of the fuselage, the combination with a flexible seal disposed on a part of the fuselage for cooperation with the adjacent edge of the canopy upon the closing of the latter to create a fluid tight joint between the canopy and fuselage, of means carried by the canopy to engage and act on said seal as and when the canopy combines as aforesaid with the fuselage to develope sealing pressure by the seal on adjoining portions of both the fuselage and the canopy, a releasable locking mechanism positioned at the adjoining edge portions of the canopy and the fuselage to releasably secure the former to the latter and thereby maintain the sealing cooperation between the seal, and the canopy and the fuselage, a valve for opening and closing said pressure-equalizing opening, and unitary means associated with both the locking mechanism and said valve for successively operating them to equalize the pressure within the cabin and the atmospheric pressure without the cabin prior to the release of the aforesaid locking mechanism and the breaking of the cooperation between the seal and the canopy.

10. In an aircraft embodying a fuselage and an openable and jettisonable canopy combining with the fuselage to define and enclose a high pressure cabin said fuselage having a pressure-equalizing opening arranged and organized to establish communication when open between the interior and exterior of the cabin, the combination with a locking mechanism to releasably secure the canopy to the fuselage when it defines and encloses the pressure cabin as aforesaid, of a valve coordinated with said locking mechanism to open said pressure-equalizing opening and reduce the internal pressure of the cabin to the surrounding atmospheric pressure prior to the opening or jettisoning of the canopy by said locking mechanism.

11. In an aircraft embodying a fuselage and an openable canopy combining with the fuselage to define and enclose a high pressure cabin, the combination with a locking mechanism to releasably secure the closed canopy to the fuselage, of a seal interposed between the canopy and fuselage to render the joint therebetween fluid tight, an equalizing valve assembly arranged and organized to establish communication, when open, between the interior and exterior of the cabin, and unitary means for successively operating said locking mechanism and opening said valve assembly to equalize the pressure between the interior and exterior of the cabin prior to the release of the canopy from the fuselage by the locking mechanism aforesaid.

12. The combination with a fixed aircraft structure and a movable canopy coacting therewith to define and enclose a pressure cabin, of a reciprocable locking mechanism for securing the canopy to the aircraft structure, a pivoted lever, a link connecting said lever to the locking mechanism whereby its pivotal movement reciprocates the locking mechanism, and a valve assembly under the control of said lever, to establish communication between the pressure cabin and the surrounding atmosphere upon the initial movement of the lever and prior to the release of the locking mechanism.

13. The combination with a fixed aircraft structure and a movable canopy coacting therewith to define and enclose a pressure area, of a series of pairs of apertured flanges attached to the fixed structure, an apertured lug secured to the canopy for cooperation with each pair of flanges on the fixed structure and to be positioned between said flanges with its aperture aligned with the apertures of the latter upon the closing of the canopy, a plurality of reciprocable pins, one for each set of flanges and lug, operating means for reciprocating said pins in unison to project them through, or remove them from, the aligned apertures aforesaid, and a valve coacting with and under the control of said operating means to open upon the initiation of the movement of the pins in withdrawing from said apertures, said valve remaining open during such withdrawing movement and at least until said pins are completely withdrawn from the apertures of the lugs.

14. In an aircraft having a pressurized cabin provided with a hinged door, the combination with said door: of a latching mechanism to lock the door in its closed position; a decompression valve to relieve the pressure within the cabin prior to opening of said door, manual means to operate conjointly said valve and said latching mechanism; and means incorporated in said latching mechanism to create a lag between the opening of the valve and the actual unlatching of the door.

15. The combination with a fixed aircraft structure and a canopy movably coacting therewith to define and enclose a pressure cabin said structure having a pressure-equalizing opening which when opened establishes communication between the interior and exterior of the cabin, of a reciprocable locking mechanism for securing the canopy to the aircraft structure, a normally closed valve associated with and closing the pressure equalizing opening, and a common operating means for said locking mechanism and said valve whereby the latter opens in advance of the release of the canopy by the locking mechanism.

PAUL PEVNEY.

REFERENCES CITED

The following references are of record in the file of this patent:

UNITED STATES PATENTS

| Number | Name | Date |
|---|---|---|
| 1,461,700 | Nichols | July 10, 1923 |
| 1,497,140 | Green | June 10, 1924 |
| 1,804,156 | Drbul | May 5, 1931 |
| 1,823,595 | Ducroux | Sept. 15, 1931 |
| 2,104,144 | Zand | Jan. 4, 1938 |
| 2,125,752 | Saulnier | Aug. 2, 1938 |
| 2,219,382 | Conlon | Oct. 29, 1940 |
| 2,258,724 | Wagner et al. | Oct. 14, 1941 |
| 2,263,806 | Hammerl | Nov. 25, 1941 |
| 2,361,298 | Laddon | Oct. 24, 1944 |

FOREIGN PATENTS

| Number | Country | Date |
|---|---|---|
| 472,366 | Great Britain | Sept. 22, 1937 |
| 794,152 | France | Dec. 2, 1935 |